Patented Jan. 15, 1946

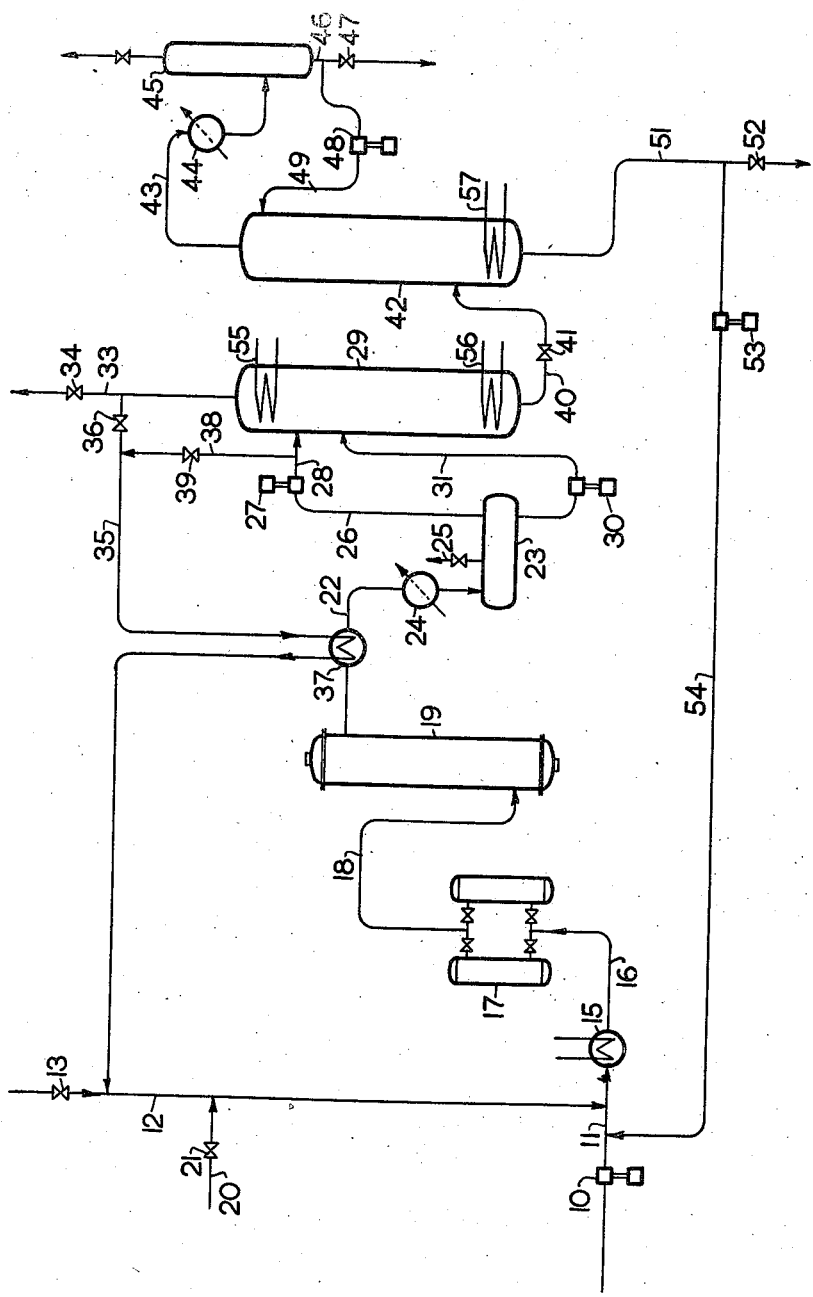

2,393,051

UNITED STATES PATENT OFFICE 2,393,051

ISOMERIZATION OF PENTANE

Frank M. McMillan and Harry A. Cheney, Berkeley, Calif., assignors to Shell Development Company, San Francisco, Calif., a corporation of Delaware Application August 29, 1941, Serial No. 408,754

5 Claims. (Cl. 260—683.5)

This invention relates to the catalytic isomerization of pentane.

Pentane is obtained in considerable quantities from natural sources such as crude oil and natural gas, and from the products of many refinery operations wherein hydrocarbons are treated at elevated temperatures. Pentane occurring in natural sources consists predominantly, and often exclusively, of the normal or straight-chain compound. The products resulting from refinery operations contain the branch-chain compounds in amounts which vary greatly with the nature of the operation. Pentane is, however, more readily and predominantly available in the straight-chain or normal form.

Part of the available pentanes is utilized as blending material in the manufacture of motor fuels and a part is utilized as starting material for the manufacture of higher-boiling hydrocarbon materials. Normal pentane is chemically quite unreactive and, in view of its poor ignition characteristics, is a poor fuel component for internal combustion engines. Its isomer, isopentane, on the other hand, is far more reactive chemically and can easily be alkylated with olefinic hydrocarbons to produce saturated higher molecular weight hydrocarbons having excellent ignition characteristics. It is, of itself, an exceptionally valuable motor fuel component. Isopentane, furthermore, is a valuable starting material for the preparation of a wide variety of organic compounds containing tertiary carbon atoms. In view of the vastly superior properties of isopentane over normal pentane, a process enabling the more efficient isomerization of normal pentane to isopentane is highly desirable.

It is well known that the aluminum halides possess the ability to catalyze the hydrocarbon isomerization reaction. These catalysts, however, are also effective in catalyzing the decomposition of hydrocarbons. By the term "decomposition" as used throughout this specification and the attached claims is meant the rupture of carbon to carbon and/or carbon to hydrogen bonds of the hydrocarbon molecule to result in the formation of hydrocarbons of lower molecular weight than pentane. Thus, processes have been disclosed wherein hydrocarbon mixtures having a relatively wide boiling range are converted in the presence of an aluminum halide catalyst to hydrocarbon mixtures possessing an appreciably lower boiling range. These processes involve the decomposition of at least a considerable part of the hydrocarbon charge to lighter hydrocarbons and may involve secondary reactions whereby the latter products interact, or react with unconverted components of the charge to produce the final product. Much effort has been expended in attempts to control the tendency of these catalysts to catalyze the decomposition of hydrocarbons and thereby enable the isomerization reaction to predominate. In the case of the conversion of normal butane to isobutane, satisfactory processes have been developed. Butane, the first member of the isomerizable hydrocarbons, is, compared to its higher homologues, comparatively stable. It may be treated under relatively severe conditions with even highly active isomerization catalysts with only minor amounts of decomposition. Pentane, however, is particularly prone to undergo decomposition in the presence of isomerization catalysts. When pentane is treated in some of the isomerization processes used heretofore, an appreciable amount of pentane can, under certain conditions, be isomerized. The extent to which decomposition unavoidably accompanies the isomerization reaction, however, generally acts as a serious deterrent to the practical application of these processes to the isomerization of pentane. These decomposition reactions are detrimental not only because they occasion considerable loss of pentane by converting it to undesirable by-products, but because these by-products, even were they to be formed in only relatively small amounts, generally bring about rapid destruction of catalyst activity. The hitherto proposed isomerization processes, although they may be used for the isomerization of butane, are therefore generally unsuitable for the practical isomerization of pentane.

It is an object of the present invention to provide an improved process whereby normal pentane can be converted efficiently to isopentane in the vapor phase without any substantial decomposition of the pentanes.

In accordance with the present invention, normal pentane, in admixture with isobutane, is contacted in the vapor phase with a catalyst comprising an aluminum halide and a porous support material at correlated conditions of temperature, catalyst activity, and proportion of isobutane to isopentane, whereby normal pentane is isomerized to isopentane without any substantial decomposition of the pentanes.

The catalyst used in the process of the invention comprises an aluminum halide such as, for example, aluminum chloride, aluminum bromide, or a mixture of aluminum chloride and aluminum bromide in combination with a suitable carrier or support material. Although a great many inert porous support materials such as, for example, fire brick, silica stone, charcoal, pumice, etc., may suitably be used, it is preferred to use as the support material certain adsorptive materials which greatly enhance the catalytic activity of the aluminum halide. These adsorptive materials comprise mineral or mineral-like compounds containing bound water such as the kaolinites (pipe clays), terrana, floridine, pyrophillite, apophyllite, meerschaum, serpentine, kieserite, bentonite, and the like, as well as the prepared hydrated materials such as the prepared permutites and zeolites, aluminum oxides, magnesium oxides, silicas, etc., prepared by partial dehydration of the respective hydroxides and the like, and other aluminous and/or silicious adsorptive materials. A particularly active catalyst comprises a combination of aluminum chloride and adsorptive alumina, and for the purpose of convenience the following detailed description of the invention will be made with reference to this catalyst.

These catalysts are particularly effective in catalyzing the hydrocarbon isomerization reaction. However, when they are applied to the isomerization of normal pentane, the isomerization reaction is generally accompanied by a substantial amount of decomposition, resulting in a rapid decline of catalyst activity. It has now been found that by effecting the catalytic isomerization in the presence of isobutane added in excess of a certain minimum proportion determined by temperature conditions and activity of the particular catalyst used, decomposition can be substantially completely suppressed. It has also been found that a substantially higher level of catalyst activity can be obtained and maintained over prolonged periods of operation by control of the concentration of isobutane in the reaction zone.

The proportion of isobutane to pentane to be maintained within the reaction zone may vary within the scope of the invention in accordance with the composition of the particular catalyst used and the operating conditions employed. Maintenance of a substantial molecular excess of isobutane in the reactants is, however, essential to attain substantially complete suppression of pentane decomposition at a high level of catalyst activity, as measured by conversion of normal pentane to isopentane in a single passage of the reactants through the reaction zone. The effect of increased isobutane concentration in the reactants is evidenced by the following examples:

*Example I*

Normal pentane was isomerized in the vapor phase in the absence of added isobutane under the following conditions:

Catalyst: Activated alumina impregnated with 22% by weight of anhydrous aluminum chloride
Temperature: 50° C.
Pressure: between 15 and 20 p. s. i. abs.
Space velocity: 5 mols n-pentane/liter of catalyst/hour
Promoter: 1 mol per cent HCl in hydrocarbon charge.

In this operation severe decomposition of pentane was encountered, resulting in a rapid decline of catalyst activity.

*Example II*

Normal pentane was isomerized in the vapor phase under the conditions of Example I with the exception that isobutane was added to the pentane charge and the partial pressure of pentane was maintained at 20 p. s. i. abs. Under these conditions the space velocity and amount of promoter used were as follows:

Space velocity: 5 mols n-pentane/liter of catalyst/hour
5 mols isobutane/liter of catalyst/hour
Promoter: 1 mol per cent HCl (based on total hydrocarbon feed)

Substantial decomposition occurred during thirteen hours of continuous operation. Thereafter, isomerization proceeded in the substantial absence of decomposition reactions. However, the maximum conversion of normal pentane to isopentane which could be obtained under these conditions did not exceed 30%.

It is apparent that, although the presence of isobutane in concentrations slightly in excess of equal molecular proportions with respect to pentane ultimately suppresses the decomposition of pentane when using the above-described catalysts, it does so at a relatively low level of catalyst activity. It has been found, however, that by increasing the concentration of isobutane in the reactants, complete suppression of pentane decomposition at a considerably higher level of catalyst activity is obtained, as shown by the following examples:

*Example III*

Normal pentane was isomerized under the conditions set forth in Example II with the exception that the amount of isobutane in the charge was doubled, the partial pressure of pentane being maintained at 20 p. s. i. abs. The space velocity was then as follows:

5 mols n-pentane/liter of catalyst/hour
10 mols isobutane/liter of catalyst/hour Isomerization of pentane to isopentane at a high level of catalyst activity in the absence of decomposition was obtained. At the end of thirty hours of continuous operation, a conversion of normal pentane to isopentane of 50% was obtained, the rest of the pentane charge remaining substantially unchanged.

*Example IV*

Normal pentane was isomerized in the vapor phase under the conditions of Examples II and III, but with the exception that the molar ratio of isobutane to n-pentane in the feed was raised to 4 to 1, the partial pressure of pentane being maintained at 20 p. s. i. abs. Under these conditions, the space velocity was as follows:

5 mols n-pentane/liter of catalyst/hour
20 mols isobutane/liter of catalyst/hour Decomposition of pentane was not apparent at any time during the operation and the isomerization proceeded at an exceedingly high level of catalyst activity. Conversions of normal pentane to isopentane as high as 80% were obtained. An average conversion of normal pentane to isopentane of 52% was obtained for a period of 390 hours of continuous operation.

It is seen that the maintenance of a substantial molecular excess of isobutane in the reaction zone not only makes possible the isomerization of normal pentane in the vapor phase in the absence of pentane decomposition, but enables the isomerization to proceed at an exceedingly high level of catalyst activity. It is furthermore to be noted that the presence of isobutane in substantial molecular excess enables the maintenance of this high level of catalyst activity over prolonged periods of operation. The process of the invention is, therefore, preferably executed in the presence of a substantial molecular excess of isobutane in the reactants and preferably with the maintenance of a molecular concentration of isobutane to pentane of at least 2 to 1. It is preferred to maintain the isobutane content of the reactants not substantially in excess of that required to attain the above-described advantageous results. Molecular proportions of isobutane to pentane of from approximately 4 to 1 to approximately 5 to 1 need generally not be exceeded to obtain the optimum results of the process. It is to be understood, however, that greater concentrations of isobutane, up to, for example, molecular proportions of isobutane to pentane of 7 to 1, and even higher, may be used if desired.

It has been shown that the concentration of isobutane in the reactants influences the level of catalyst activity at which isomerization can be carried out in the absence of pentane decomposition, and that for a catalyst of a given maximum level of activity a certain minimum concentration of isobutane must be maintained in the reactants to enable the isomerization to proceed at this maximum level of catalyst activity without decomposition of pentane. Thus, at a high level of catalyst activity, a higher concentration of isobutane is required to suppress decomposition than at a lower level of catalyst activity. In the above examples it is shown that at a level of catalyst activity resulting in a conversion of pentane to isopentane of 50%, a molar ratio of isobutane to pentane of approximately 2 to 1 was sufficient to suppress decomposition, whereas under the same conditions of operation a catalyst at a sufficiently high level of activity to produce a conversion of pentane to isopentane of approximately 80% required a molar concentration of isobutane to pentane of about 4 to 1. The concentration of isobutane to be maintained during the operation of the process of the invention can therefore be varied in accordance with variations in catalyst activity. In a preferred modification of the invention, a high concentration of isobutane is maintained during the initial part of the run when the activity of the catalyst is greatest, and progressively reduced during the course of the operation as catalyst activity declines. Thus, when utilizing the catalyst comprising aluminum chloride in combination with adsorptive alumina, an initial molecular concentration of isopentane to pentane in excess of 2 to 1, for example about 4 to 1, may be maintained and progressively reduced to a molecular proportion preferably not below approximately 1 to 1, as the activity of the catalyst declines. Care is taken, however, that the concentration of isobutane in the reactants is at all times sufficiently high to substantially avoid any pentane decomposition.

It is to be noted that the unusual effectiveness in suppressing decomposition in the vapor phase isomerization of pentane, and in maintaining the high level of activity of the above-described catalysts, is not possessed by normal butane or propane. The effect of substituting n-butane for isobutane is illustrated by the following example:

Example V

Pentane was isomerized at the conditions of Example IV with the exception that normal butane was substituted for isobutane. Excessive pentane decomposition was encountered for a period of seven hours. Thereafter decomposition subsided but the activity of the catalyst had fallen to such a degree that a conversion of normal pentane to isopentane of only 17% was obtained.

Although normal butane has no substantial effect as a suppressant of the undesired decomposition reactions, the presence of lesser amounts of this hydrocarbon is not harmful and it may be present in the reaction zone or in the isobutane recycled in the system. In carrying out the process of the invention on a practical scale, normal butane may be separated from recycled isobutane to any desired degree. The recycled hydrocarbon stream may, however, comprise normal butane and isobutane in relative proportions corresponding approximately to those of the equilibrium mixture at the conditions of operation.

The process of the invention permits the attainment of exceedingly high conversions at relatively low temperatures, for example not in excess of about 60° C. Although it is preferred to execute the process in this preferred temperature range, somewhat higher temperatures, for example up to approximately 100° C., may suitably be used. It is to be noted that with increase in the operating temperature relatively greater proportions of isobutane to pentane must be maintained to suppress decomposition. The process may be executed under atmospheric, subatmospheric, or superatmospheric pressures. Suitable superatmospheric pressures comprise those enabling maintenance of the reactants in the vapor state at the isomerization temperatures used. Pressures up to, for example, about 150 pounds, have been found to be suitable.

The method of the invention, whereby normal pentane is isomerized in the vapor phase without any substantial decomposition of pentane, lends itself readily to efficient application on a practical scale. The attached drawing shows a more or less diagrammatic elevational view of one form of apparatus suitable for carrying out the process of the invention.

Referring to the drawing, normal pentane drawn from an outside source is forced by means of pump 10 through line 11, into a suitable heating zone. Isobutane drawn from an outside source, or recycled from within the system as described more fully here-below, is passed through line 12, controlled by valve 13, and admixed with the pentane charge flowing through line 11 to the heating zone. The amount of isobutane so introduced into line 11 is carefully controlled to maintain a ratio of isobutane to pentane within the above-described limits.

The heating zone may suitably consist of a conventional fluid heating furnace or a suitable indirect heat exchanger 15. From heat exchanger 15, the preheated stream is passed through line 16 into a drying zone. The drying zone may consist of a plurality of chambers 17 containing a suitable dehydrating medium such as, for example, alumina, calcium chloride, or the like. In passing through the dehydrating medium within chambers 17, any moisture within the hydrocarbon stream is removed therefrom. From chambers 17, the preheated, dried hydrocarbon stream is passed through line 18, into a reaction zone. The reaction zone may suitably consist of a plurality of tubes or a chamber of restricted cross-sectional area 19. Although but one reaction chamber is shown in the drawing, it is to be understood that more than one such chamber, in series or parallel vapor communication with one another, may suitably be used. A suitable isomerization catalyst of the type described above such as, for example, anhydrous aluminum chloride in combination with adsorptive alumina, is maintained within reaction chamber 19. Temperature conditions within the above-described range of temperatures suitable for isomerizing normal pentane in accordance with the invention are maintained in chamber 19 by control of the heat input into heat exchanger 15. In passing through the catalyst within reaction chamber 19 under the prescribed conditions, normal pentane is isomerized to isopentane without any substantial decomposition of the pentanes at a high level of catalyst activity.

The isomerization, when employing catalysts of the above type, is preferably effected in the presence of a hydrogen halide such as, for example, hydrogen chloride. This is preferably introduced into the reaction chamber with the hydrocarbon feed. Hydrogen chloride is therefore drawn from an outside source through line 20, provided with valve 21, leading into line 12. The amount of hydrogen chloride introduced into the system may vary widely in accordance with the catalyst composition and the operating conditions employed. The hydrogen chloride introduced into line 11 may amount to, for example, from 0.3% to approximately 25% of the pentane charge.

A mixture comprising isopentane, unconverted normal pentane, isobutane, hydrogen chloride, and any normal butane which may have been formed by the isomerization of isobutane, is withdrawn from reaction chamber 19 and passed through line 22 into accumulator 23. A cooler 24 is positioned in line 22. In passing through cooler 24, the stream is cooled to a temperature at least sufficiently low to effect the condensation of the pentanes. If desired, additional cooling or refrigerating means may be provided to aid in cooling the stream flowing through line 22. Accumulator 23 is provided with a vent 25 to permit elimination therefrom of any gaseous products if this should be desired during the course of the process. Vapors and gases comprising hydrogen chloride and $C_4$ hydrocarbons are drawn from accumulator 23 through line 26 to compressor 27. From the high pressure side of compressor 27, the stream is passed through line 28 into a fractionator 29. Liquid comprising $C_4$ and $C_5$ hydrocarbons is drawn from accumulator 23 and forced by means of pump 30 through line 31, into fractionator 29. Within fractionator 29, a gaseous fraction comprising isobutane and hydrogen chloride is separated from a liquid fraction comprising pentanes. A high pressure, for example in excess of about 150 pounds, is maintained within fractionator 29 to aid in effecting the desired separation. The gaseous fraction, comprising hydrogen chloride, isobutane, and some normal butane is withdrawn from fractionator 29 through line 33 and recycled at least in part through line 35, controlled by valve 36, to line 12. A heat exchanger 37 is positioned in line 35 to permit indirect heat exchange between the gaseous stream flowing through line 35 and the hot reaction products emanating from chamber 19. If desired, a part or all of the gaseous stream taken overhead from fractionator 29 may be subjected to any desired additional fractionation to separate any constituents such as, for example, normal pentane, therefrom prior to recycling the stream through line 35. The hydrogen chloride and isobutane separated from the reaction products may be recycled to the reaction zone in separate streams by means not shown in the drawing. By means of line 38, provided with valve 39, at least a part of the gaseous stream flowing through line 28 may be passed directly into line 35, should this be desired.

Liquid, comprising $C_5$ hydrocarbons, is withdrawn from the bottom of column 29 and passed through line 40, controlled by valve 41, into a second fractionator 42. Within fractionator 42, a vapor fraction comprising isopentane is separated from a liquid fraction comprising normal pentane. The vapor fraction is withdrawn from the top of fractionator 42 and passed through line 43 and cooler 44, into an accumulator 45. In passing through cooler 44, the stream is cooled to a temperature sufficiently low to effect the condensation of isopentane. Liquid comprising isopentane is withdrawn from accumulator 45 through line 46, provided with valve 47, as the desired product of the process. A part of the liquid flowing through line 46 is forced by means of pump 48 through line 49, as reflux, to the upper part of fractionator 42. Liquid, comprising normal pentane, is withdrawn from the lower part of fractionator 42 through line 51, controlled by valve 52, and eliminated from the system. At least a part of the liquid comprising normal butane flowing through line 51 is forced by means of pump 53 through line 54 into line 11.

Fractionator 29 is provided with suitable cooling means in the upper part thereof such as, for example, a closed cooling coil 55. Suitable heating means such as reboilers or closed heating coils 56 and 57 are provided in the lower part of fractionators 29 and 42, respectively, to aid in effecting the desired fractionation therein.

The pentane and isobutane charged to the system are preferably substantially free of any materials which are prone to undergo undesired reactions at the operating conditions. Such impurities, if present in the hydrocarbons charged, may be removed therefrom by any suitable pretreatment. Thus, unsaturated hydrocarbons may be eliminated by a pretreatment such as acid treating, hydrogenation, or the like.

We claim as our invention:

1. In a process for isomerizing normal pentene to isopentane wherein normal pentane vapors in admixture with added isobutane are contacted at a temperature not exceeding about 60° C. with a catalyst comprising aluminum chloride in combination with adsorptive alumina whereby said catalyst declines in activity as the operation proceeds, the improvement which comprises maintaining an initial molar ratio of isobutane to pentane of at least 4:1, progressively reducing the ratio of isobutane to pentane to a minimum molar ratio of 2:1 as the activity of the catalyst declines, and controlling said progressive reduction of isobutane to maintain the ratio of isobutane to pentane at all times sufficiently high within said prescribed range to effect the conversion of normal pentane to isopentane in the absence of any substantial hydrocarbon decomposition.

2. In a process for isomerizing normal pentane to isopentane wherein normal pentane vapors in admixture with added isobutane are contacted at isomerizing conditions with a catalyst comprising aluminum chloride in combination with adsorptive alumina whereby said catalyst declines in activity as the operation proceeds, the improvement which comprises maintaining an initial molar ratio of isobutane to pentane of at least 4:1, progressively reducing the ratio of isobutane to pentane to a minimum molar ratio of 2:1 as the activity of the catalyst declines, and controlling said progressive reduction of isobutane to maintain the ratio of isobutane to pentane at all times sufficiently high within said prescribed range to effect the conversion of normal pentane to isopentane in the absence of any substantial hydrocarbon decomposition.

3. In a process for isomerizing normal pentane to isopentane wherein normal pentane vapors in admixture with added isobutane are contacted at isomerizing conditions with a catalyst comprising an aluminum halide in combination with adsorptive alumina whereby said catalyst declines in activity as the operation proceeds, the improvement which comprises maintaining an initial molar ratio of isobutane to pentane of at least 4:1, progressively reducing the ratio of isobutane to pentane to a minimum molar ratio of 2:1 as the activity of the catalyst declines, and controlling said progressive reduction of isobutane to maintain the ratio of isobutane to pentane at all times sufficiently high within said prescribed range to effect the conversion of normal pentane to isopentane in the absence of any substantial hydrocarbon decomposition.

4. In a process for isomerizing normal pentane to isopentane wherein normal pentane vapors in admixture with added isobutane are contacted at a temperature not exceeding 100° C. with a catalyst comprising an aluminum halide in combination with an adsorptive material whereby said catalyst declines in activity as the operation proceeds, the improvement which comprises maintaining an initial molar ratio of isobutane to pentane of at least 4:1, progressively reducing the ratio of isobutane to pentane to a minimum molar ratio of 2:1 as the activity of the catalyst declines, and controlling said progressive reduction of isobutane to maintain the ratio of isobutane to pentane at all times sufficiently high within said prescribed range to effect the conversion of normal pentane to isopentane in the absence of any substance hydrocarbon decomposition.

5. In a process for isomerizing normal pentane to isopentane wherein normal pentane vapors in admixture with added isobutane are contacted at isomerizing conditions with a catalyst comprising an aluminum halide in combination with an adsorptive material whereby said catalyst declines in activity as the operation proceeds, the improvement which comprises maintaining an initial molar ratio of isobutane to pentane of at least 4:1, progressively reducing the ratio of isobutane to pentane to a minimum molar ratio of 2:1 as the activity of the catalyst declines, and controlling said progressive reduction of isobutane to maintain the ratio of isobutane to pentane at all times sufficiently high within said prescribed range to effect the conversion of normal pentane to isopentane in the absence of any substantial hydrocarbon decomposition.

FRANK M. McMILLAN.
HARRY A. CHENEY.